Y. W. SMITH.
Hop-Vine Trellis.
No. 81,426. Patented Aug. 25, 1868.
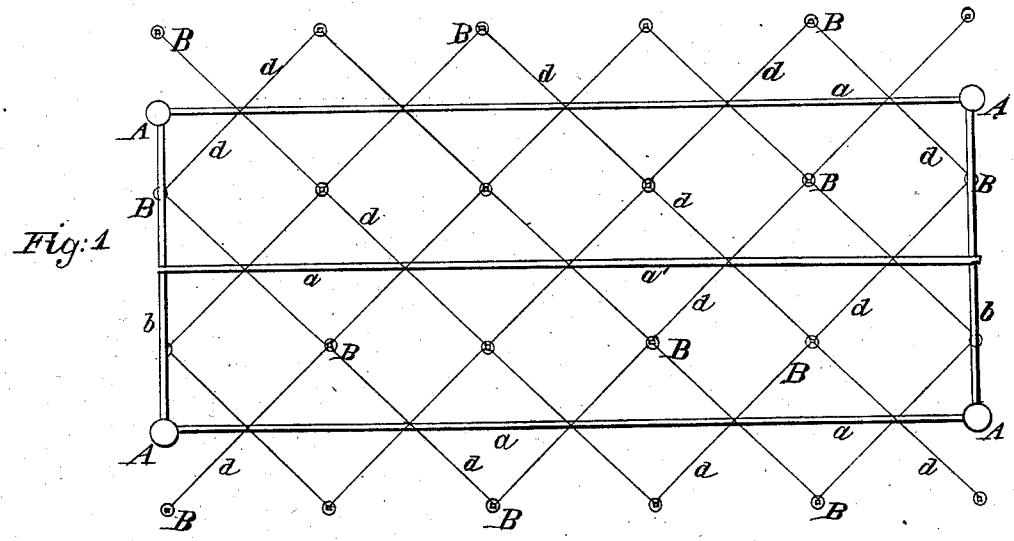
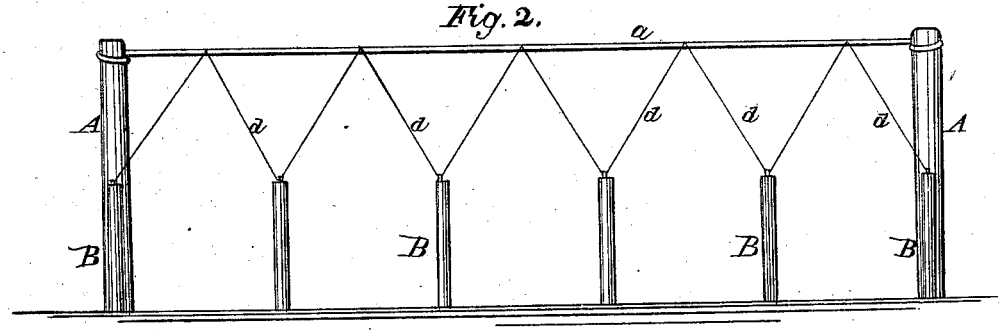
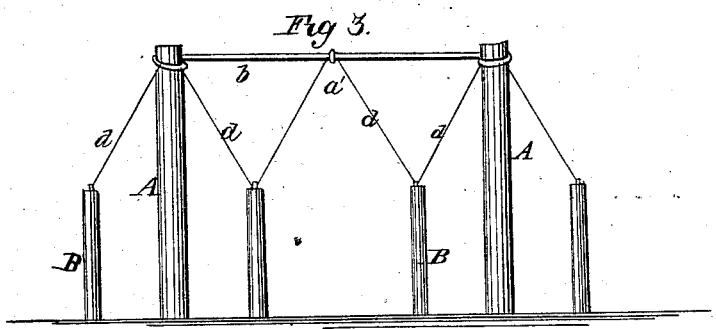

United States Patent Office.

YOUNGS W. SMITH, OF BRISTOL, NEW YORK.

Letters Patent No. 81,426, dated August 25, 1868.

---

IMPROVEMENT IN HOP-VINE TRELLIS.

---

The Schedule referred to in these Letters Patent and making part of the same.

---

TO ALL WHOM IT MAY CONCERN:

Be it known that I, YOUNGS W. SMITH, of Bristol, in the county of Ontario, and State of New York, have invented a certain new and improved Trellis for Hop-Vines; and I do hereby declare that the following is a full and exact description thereof, reference being had to the accompanying drawings, making part of this specification.

Figure 1 is a plan of my improved trellis.
Figure 2, a side elevation of the same.
Figure 3, an end elevation.
Like letters of reference indicate corresponding parts in all the figures.

My invention consists in the arrangement of posts or standards, and supporting connecting-wires, in combination with stakes and diagonal cords for training the vines upon, substantially as hereinafter set forth.

In the accompanying drawings, A A are elevated posts or standards situated at opposite ends of the trellis, and supporting the parallel wires or cords $a\ a$. The end posts are likewise connected by cross-wires or cords, $b\ b$, to which are secured intermediate wires, $a'\ a'$, similar to $a\ a$.

Stakes B B, set at uniform distances apart from the rows, run at right angles to each other. To the top of each of these stakes I attach a cord or twine, $d$, which passes diagonally over the supporting-wire $a$, which hangs intermediate between two rows of stakes, and at a considerable elevation above them, and is connected with a stake of the next row, thence diagonally back to the next alternate stake of the first row, so continuing to the end of the trellis, then returning by connecting with each alternate stake in the same manner. This process is repeated with each pair of rows until the whole section is crossed diagonally by the twine, forming a complete net-work, the cords radiating regularly in four directions from the top of each stake.

I prefer to have but four vines trained upon each stake B B, and at the top of the stakes the vines are trained off in opposite directions, one following each of the cords $d$. Their growth will ordinarily take them up to the supporting-wires $a\ a'$, but if continued, they find an adequate support in those wires.

In raising hops, it is a matter of much importance that the vines should be kept separated from each other, so as to allow a free circulation of air between them, and exposure to the sun. When the vines are allowed to grow in masses, they are more subject to the ravages of insects and to the formation of mildew and rust, and greatly deteriorates their growth and lessens their yield.

By my improvement and system of training, these difficulties are obviated. The vines are not only kept separated, and each one allowed an independent growth, but by the open net-work of the trellis, the air is allowed a free circulation throughout, and the vines are effectually exposed to the light and sun.

By the employment of the cross-wire $b$, I dispense with the use of any intermediate posts, A, for attaching the wire supports $a'$ to, thereby requiring but one post at each corner, and thus lessening the cost.

What I claim as my invention, and desire to secure by Letters Patent, is—

The improved hop-trellis, formed of the elevated parallel supporting-wires $a\ a$ and standards A A, in combination with stakes B B, and diagonal net-work of twine, alternating from row to row, and stake to stake, over the intermediate supporting-wires, $a\ a'$, arranged substantially as set forth.

In witness whereof, I have hereunto signed my name in the presence of two subscribing witnesses.

YOUNGS W. SMITH.

Witnesses:
J. A. DAVIS,
W. J. CREELMAN.